(12) United States Patent
Lindsey

(10) Patent No.: US 6,315,514 B1
(45) Date of Patent: Nov. 13, 2001

(54) ADJUSTABLE BOW LIFT APPARATUS FOR A MODULE TRUCK

(75) Inventor: Russell E. Lindsey, Lubbock, TX (US)

(73) Assignee: Module Truck Systems, Inc., Lubbock, TX (US)

( * ) Notice: Subject to any disclaimer, the term of this patent is extended or adjusted under 35 U.S.C. 154(b) by 0 days.

(21) Appl. No.: 09/503,783

(22) Filed: Feb. 14, 2000

(51) Int. Cl.[7] ............................................. B60P 1/26
(52) U.S. Cl. .................. 414/491; 414/478; 414/528; 414/111; 414/132; 100/100; 298/23 C; 298/22 P; 56/28; 296/112
(58) Field of Search ........................ 414/111, 494, 414/132, 469, 491, 480, 537, 538, 569, 477, 478; 296/219, 115, 108, 112; 298/100, 101, 23 C, 22 P, 22 R; 100/100; 56/28

(56) References Cited

U.S. PATENT DOCUMENTS

| | | | |
|---|---|---|---|
| 1,024,959 | * | 4/1912 | Wolf .......................................... 298/6 |
| 1,104,447 | * | 7/1914 | Roach ..................................... 414/132 |
| 2,761,577 | * | 9/1956 | Lahman ............................. 414/494 X |
| 3,272,352 | * | 9/1966 | Adams et al. ......................... 414/111 |
| 3,450,285 | * | 6/1969 | Robinson ............................... 414/500 |
| 4,031,003 | * | 6/1977 | Husky ............................... 414/494 X |
| 4,285,273 | * | 8/1981 | Dejarnett ........................... 414/132 X |
| 5,076,174 | * | 12/1991 | Martin ................................... 105/377 |
| 5,498,066 | * | 3/1996 | Cuthbertson et al. ............. 298/23 C |
| 5,531,555 | * | 7/1996 | Meijer ............................... 414/111 X |
| 5,882,058 | * | 3/1999 | Karrer ................................... 296/39.2 |

* cited by examiner

*Primary Examiner*—Frank E. Werner

(57) ABSTRACT

An adjustable bow lift apparatus for extending the overall height between the bed and bow cover on a cotton module truck during loading or unloading a cotton module, generally including a set of metal tubular frames, one for the top of each side wall, and pivotally attached a first distance from the further most end of each side wall. A set of actuators for each side of the frame for lifting and lowering the bow lift apparatus, each actuator is attached to the last side wall frame member of the truck, with the actuator extension arms pivotally attached at the lower frame on each side of the bow lift apparatus. A plurality of on board power devices may be adapted for rasing and lowering the adjustable bow lift apparatus during loading or unloading a cotton module, such as air, hydraulics or electrical. A first and second modified bow providing level in-line support of the canvas top on a module truck, attached a first and second distance from the further most end of the bow lift apparatus frame, and extending the width of the module truck bed, and attached to the opposing frame member. A set of guide arms attached to the lower frame of the bow lift apparatus, a first, second and third distance from further most end of the apparatus, and extending downward, on the outside of the module truck side walls, of a distance in length to ensure guidance and stability of the adjustable bow lift apparatus during raising and lowering of the apparatus.

4 Claims, 3 Drawing Sheets

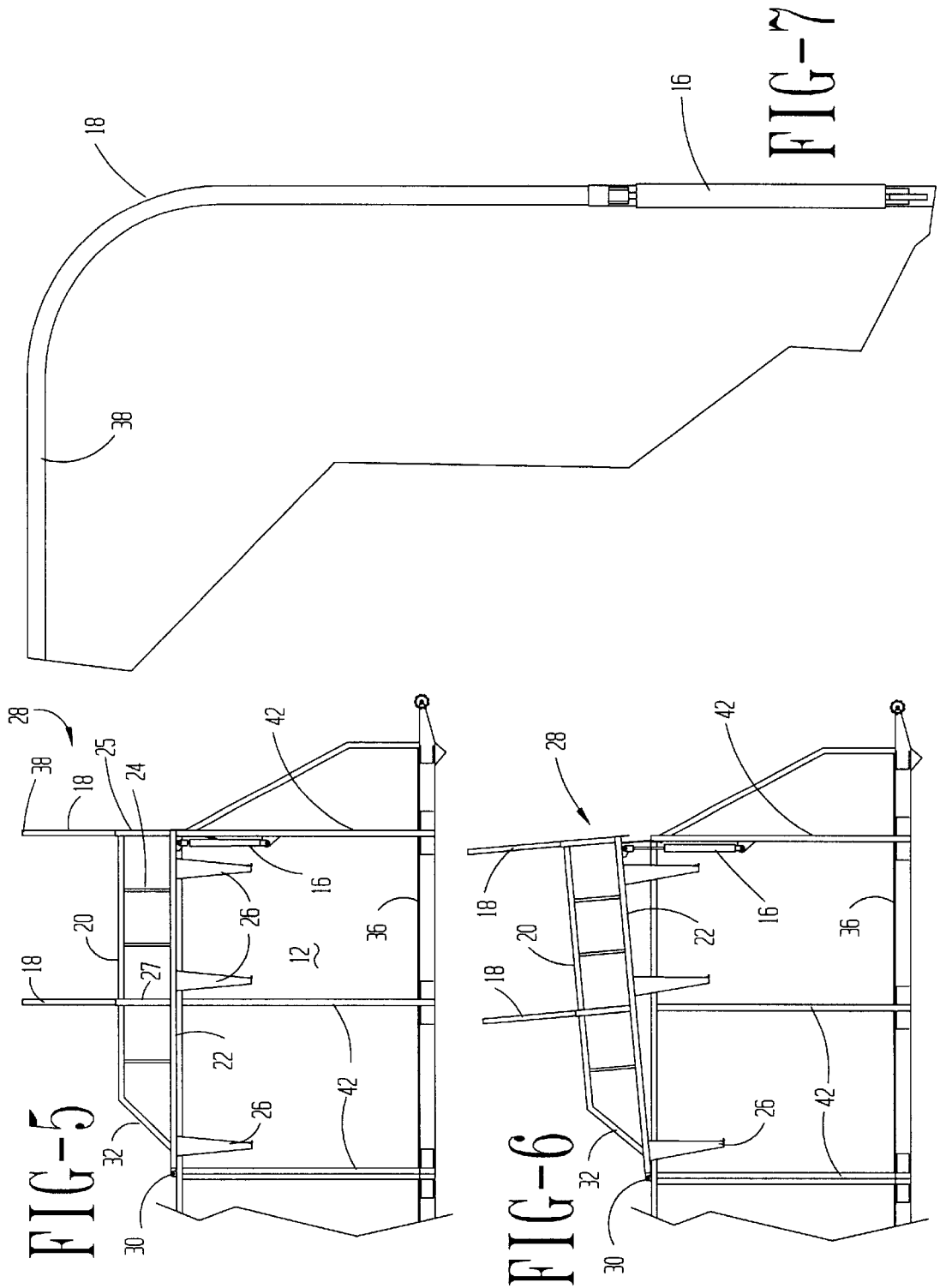

ADJUSTABLE BOW LIFT APPARATUS FOR A MODULE TRUCK

BACKGROUND OF THE INVENTION

The present invention relates to cotton modules, their size, height and weather protective coverings, and more particularly to the module trucks, that retrieve and transport these cotton modules from the fields to the cotton gins for processing.

Since the first cotton gin was built, cotton farmers and producers have all faced the difficult and time consuming task of harvesting cotton, and getting it from the harvest fields to the cotton gins for ginning. From the earliest pickers dragging their cotton sacks over their shoulders, and laboriously picking the cotton from the cotton bowl , collecting it in their sacks until they were full, and then emptying the sacks in a cotton trailer. Once these trailers were full, or the cotton field was picked clean, the cotton trailer was hooked to a tractor or tow vehicle for transporting to the gin. These type cotton trailers were usually built with four wheels and a flat bottom with a wagon tongue hitch, and a light weight frame with chicken wire or the like attached to the frame for holding the cotton. These type trailers were not only cumbersome, but were also, what is identified today as "high maintenance", how ever a cotton producer of any size had to have several dozens of trailers in order to harvest his crop. Even after the advent and acceptance of modernized cotton strippers, and collections trailers, although the cotton strippers reduced the time and labor of getting cotton into trailers, the problem with the trailers and numbers of trailers still existed for most cotton farmers and producers. Cotton farming was becoming cost prohibitive. There had to be a better way. Therefore in the early seventies, a radical and completely new material handling system was invented and developed. The cotton module system which is in use today, throughout the world in cotton producing regions.

A typical cotton module builder is manufactured from metal, having four walls without a floor or bottom, a detachably attachable tongue for hitching to a farm tractor or truck when moving from a first module building site to a second module building site. Wheels which raise the module builder for transporting from a first site to a second site, and lower the module builder to the surface in preparation for building a cotton module. By design these module builders are eight (8) foot wide and thirty-two (32) feet long (ID), also by design, there are two different heights of module builders, the first is designed for cotton pickers to dump into and is seven (7) foot,. four (4) inches tall, the second is designed for cotton strippers to dump into, and is nine (9) foot, three (3) inches tall. A bridge located on top of the module builder, moves from the front part of the module builder to the rear, and contains a reciprocating press for compacting the cotton, this is a continual process as the harvested cotton is dumped inside the module builder, until the cotton is compacted on the surface (ground) into a free standing cotton module, measuring 8 foot by 32 foot by 8 foot, or 8 foot by 32 foot by 9 foot 6 inches tall. Once, this harvesting process has been completed, the back end of the module builder is opened and the operator can pull the module builder away from the finished cotton module and to another building site. Most farmers and producers have adopted the use of canvas module tarp's for protection from incumbent weather.

The cotton module truck consist of a metal frame mounted on a road truck with an extended framework. The bed is approximately 8 foot 6 inches wide and 40 foot long. The bed has a front and two vertical sides, in addition there is a polarity of bows spaced along the length of the vertical sides to form a frame which in turn supports a canvas tarp cover for the bed of the module truck. By manufactured design, these bows may be attached at various heights to accommodate the size (height) of cotton module to be loaded and transported. The bed of a module truck tilts down until it comes in contact with the surface (ground), at which time it may then be backed under the cotton module and the cotton module loaded onto the bed, and the bed lowered back to rest on the truck frame, and transported to the gin, where the cotton module may be unloaded.

As good as this system is designed, and works; there is a recurring problem that exist. One that repeatedly causes damage to the bow covers on module trucks, and results in several hundreds of dollars in repair cost, and even more in lost revenue due to down time. In addition, more often than not, at the same time the bow cover on the module truck is being damaged or destroyed, the cotton module canvas tarp, is being damaged or destroyed, again resulting in hundreds of dollars of repair or replacement cost.

The problem that exist is, more often than not, as the cotton module is being built, to much cotton is dumped inside the builder, and as the cotton is compacted, the power of the compacting press causes the module to raise up off the ground, thus allowing more cotton to be dumped into the builder and compacted, therein resulting in taller cotton module than was intended. Then when the module truck arrives and is positioned to pick up the cotton module, the bed is tilted for loading, in this position the drivers vision of the cotton module is blocked by the tilted bed, if the cotton module has been over built and is to tall, as the cotton module is loaded, the cotton module hits the bows on the module truck, damaging or destroying them, and often damaging or destroying the canvas tarp module cover. Common sense would suggest one of two ways to prevent this problem, first, stop over building the cotton modules, although practical, during the frenzy of the harvest season, this is not likely to happen. The second way of solving this problem would seem to be, build the bows on the module truck higher, however, height limitations restrict this as a solution.

Therefore, there exist a need for an adjustable bow lift apparatus. That will extend the overall height of the opening during loading of an oversized cotton module, and return the bow lift to its normal height after the cotton module is loaded. An adjustable bow lift apparatus that is inexpensive to build, easy to install, simple to operate, and one that can be retro fitted on existing module trucks.

OBJECTS OF THE INVENTION

It is an object of the present invention, to provide an adjustable bow lift apparatus for module trucks, used in transporting cotton modules.

It is a further object of the present invention, to provide an adjustable bow lift apparatus, which may be pivotally attached onto the bed side walls of a module truck.

Another object of the present invention, is to provide an adjustable bow lift apparatus, with on board means of operating the adjustable bow lift apparatus.

Yet, another object of the present invention, is to provide an adjustable bow lift apparatus, for extending the over all height between the truck bed floor and the bow cover, while loading and unloading a cotton module.

A still further object of the present invention, is to provide an adjustable bow lift apparatus, having a plurality of lift cylinders.

It is yet, another object of the present invention, to provide an adjustable bow lift apparatus, with on board lift cylinders for raising the rear bows on a module truck, during the loading a cotton module.

And, another object of the present invention, is to provide an adjustable bow lift apparatus, with on board lift cylinders for raising the rear bows on a module truck, during the unloading a cotton module.

An object of the present invention, is to provide an adjustable bow lift apparatus, and means of automatically lifting the apparatus when the module truck bed is engaged and tilted in preparation for loading or unloading a cotton module.

And yet, another object of the present invention, is to provide an adjustable bow lift apparatus, for extending the overall clearance, from the module truck bed to the bow covering, during loading or unloading cotton modules, and thereby eliminating the "raking damage" on cotton modules, damage to cotton module weather covers, and damage to the module truck bow.

A still further object of the present invention, is to provide an adjustable bow lift apparatus, for cotton module trucks which can be retro installed on existing module trucks.

SUMMARY

The present invention pertains to a module truck used primarily for transporting cotton modules. An adjustable bow lift apparatus, comprising opposing tubular frames, pivotally attached to the side walls of a module truck, a set of opposing lift cylinders attached near the top rear outside walls of a module truck, with the extension arm attached to bow lift frame. Two modified canvas support bows attached to the top of the frames extending over the width of the truck bed. A triple set of guide arms, attached to the outside lower frame, extending down and below the truck side walls, with the bow lift in the raised position.

Other objects and advantages of the present invention will become more apparent to those persons having ordinary skill in the art to which the present invention relates, from the following description taken in conjunction with the accompanying drawings; wherein

BRIEF DESCRIPTION OF THE DRAWINGS

FIG. 5 a sectional side elevation view of an adjustable bow lift apparatus in the closed position, showing the guide arms.

FIG. 6 a sectional side elevation view of an adjustable bow lift apparatus in the up position, showing the guide arms.

FIG. 7 a cut-away sectional view of a bow lift frame, showing a power cylinder attached.

DETAILED DESCRIPTION OF THE PREFERRED EMBODIMENT

NUMERIC PARTS LIST

Figure 1:
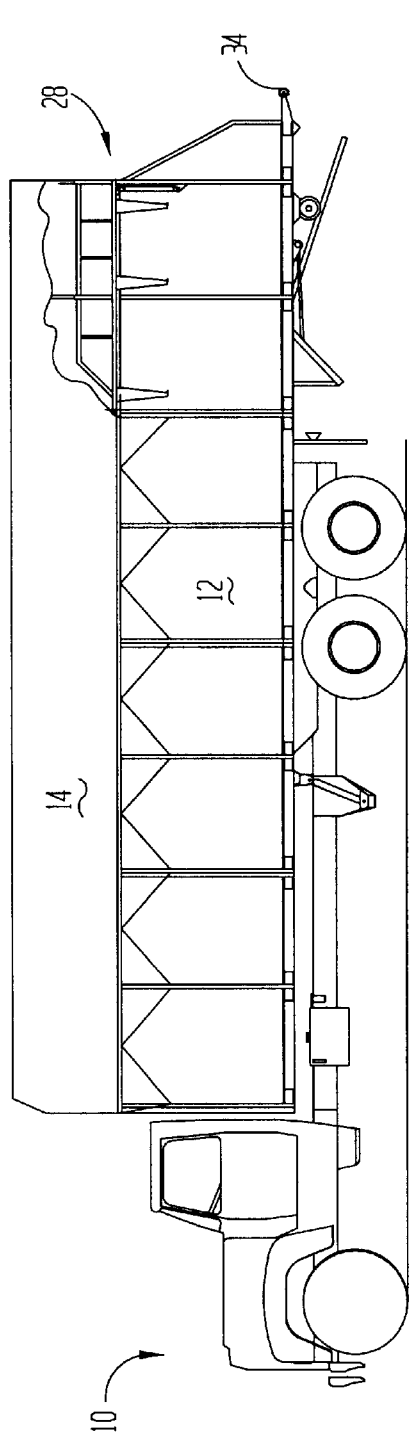
FIG. 1 a side elevation view of a module truck showing a cut-away view of an adjustable bow lift apparatus in the closed position.

10. Module Truck
12. Truck bed side walls
14. Canvas tarp cover
16. Actuator
18. Bow
20. Horizontal top frame member
22. Horizontal bottom frame member
24. Vertical cross frame member
25. Rear bow frame receptacle
26. Stabilizing guide arm members
27. Front bow frame receptacle
28. Adjustable bow lift apparatus
30. Pivot pin
32. Front angle frame member
34. Truck bed roller
36. Truck bed
38. Top clearance height between 38 and 36
40. Cotton module
42. Truck bed side wall frame member
50. Cotton module canvas tarp cover

MATERIALS AND METHOD OF MANUFACTURING

An adjustable bow lift apparatus for use on a module truck. The present invention is designed and manufactured from a variety of square and round metal tubbing, pre-cut into various lengths and parts, such as top rails, bottom rails, end rails, cross frame supports, canvas bow supports, pivot lugs, flat stock, and actuators.

For the purpose of explanation and illustration, the method of manufacturing these parts into a bow lift frame, will primarily consist of welding.

Figure 2:
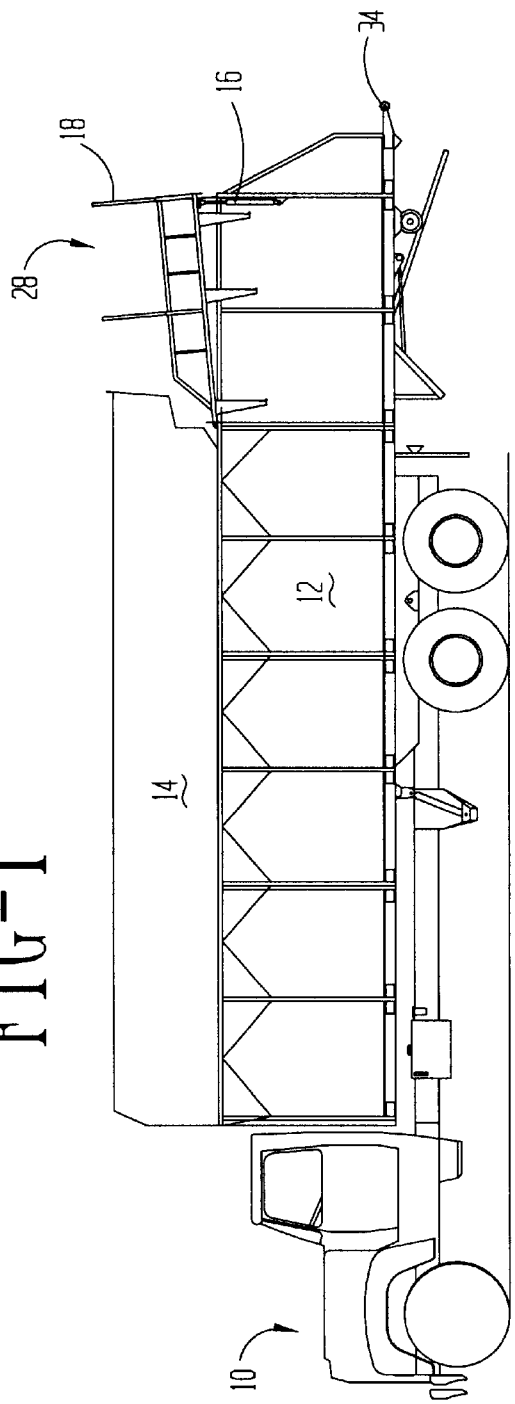
FIG. 2 a side elevation view of a module truck showing a cut-away view of an adjustable bow lift apparatus in the up position.

In the description which follows, like parts are marked throughout the specification and drawings, respectively. The drawings are not necessarily to scale and in some instances proportions have been exaggerated in order to more clearly depict certain features of the invention. Referring to FIGS. 1 and 2, a conventional module truck 10, includes a canvas tarp cover 14 supported by a plurality of bows 18 covering a truck bed 36 (FIG. 5), the truck bed 36 (FIG. 5) is framed by a rectangular bed 36, a front wall (not shown), and opposite side walls 12 extending upright from bottom bed 36 extending immediately behind the cab. FIG. 1 an adjustable bow lift apparatus 28 pivotably attached to opposing side walls 12. FIG. 2 a pivotably 30 (FIG. 6) attached adjustable bow lift apparatus 28 in a raised position by opposing actuators 16 and, a truck bed roller 34.

Figure 3:
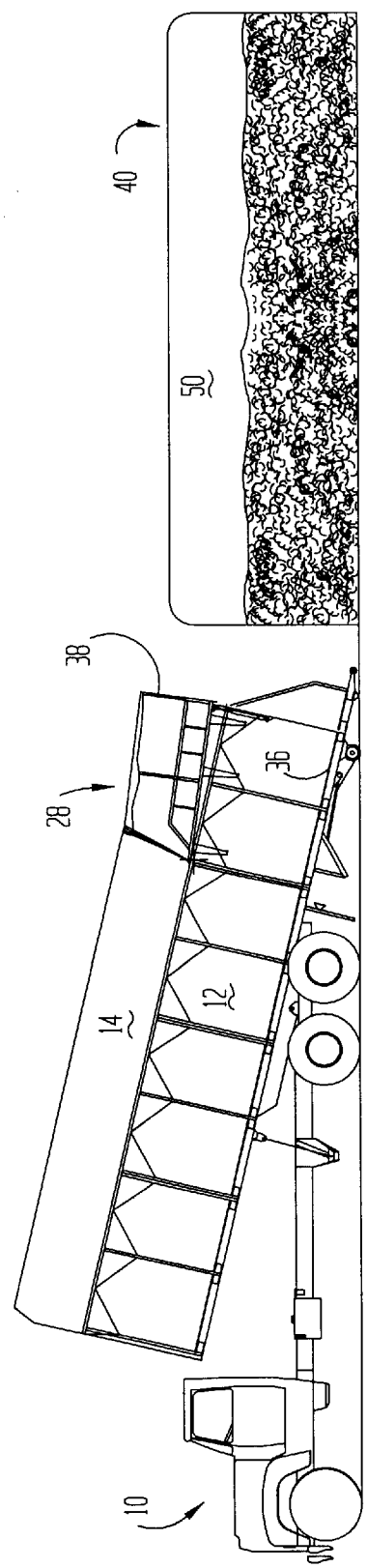
FIG. 3 a side elevation view of a module truck with the bed tilted for loading or unloading a cotton module, showing a cut-away view of an adjustable bow lift apparatus.
Figure 4:
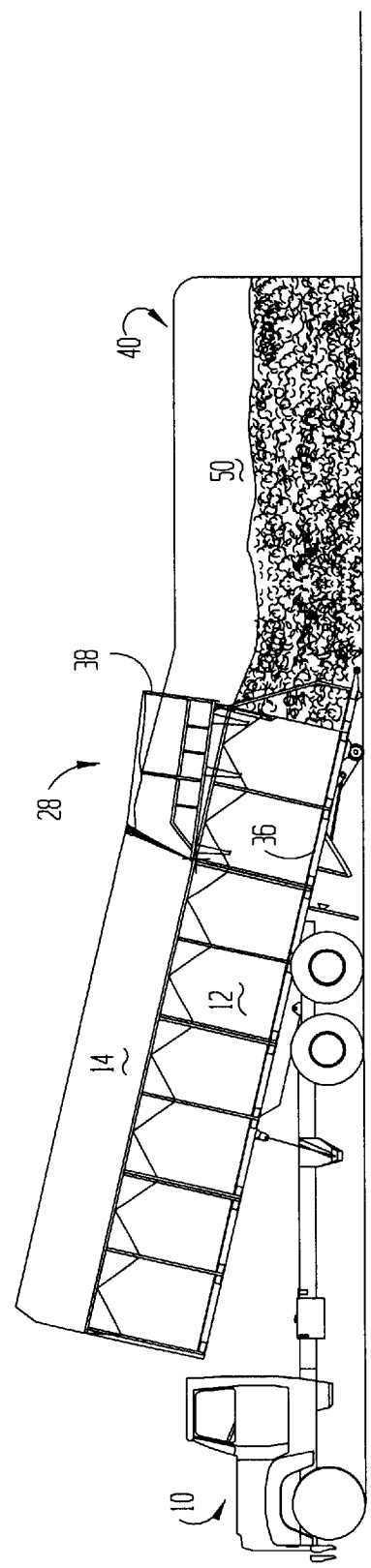
FIG. 4 a side elevation view of a module truck with the bed tilted loading or unloading a cotton module, showing a cut-away view of an adjustable bow lift apparatus in the up position providing additional clearance for an over sized cotton module.

Referring now to FIGS. 3 and 4, a conventional module truck 10, a bed 36 in a raised tilted position, an adjustable bow lift apparatus 28 in a raised position, in preparation for loading or unloading a cotton module 40. An adjustable bow lift apparatus 28 pivotably raised an additional 12 to 14 inches, increasing a clearance between bed 36 and bow support crown 38, thereby decreasing possible damage to a cotton module cover 50, and costly damage to the module truck canvas cover 14, or support bows 18. Additionally FIG. 4 a conventional module truck 10, a bed 36 in a raised tilted position, an adjustable bow lift apparatus 28 in a raised position, a cotton module 40 being loaded or unloaded, an additional clearance between bed 36 and bow crown 38, providing increased clearance for loading or unloading a cotton module 40, thereby reducing the risk of costly repairs to a cotton module cover 50, and or costly repairs or replacement of the canvas cover support bows 18.

Referring now to FIGS. 5, 6 and 7 an adjustable bow lift apparatus 28 comprising opposing bottom frame members 22, having a pivot pin frame opening 30 in conjunction with and also located a first distance from the further most rear truck side wall opposing frame members 42, and opposing top frame members 20 located a first distance from the further most rear truck side wall opposing frame members 42, additionally opposing end members 32 having forty-five degree pre-cut angles, are welded to front end top rail members 20 and front end bottom frame members 22 respectively, thereby allowing operating clearance of an adjustable bow lift apparatus 28, opposing vertical cross frame support members 24 are welded a first, second and third distance respectively, from the further most rear truck side wall opposing frame members 42, opposing vertical bow frame receptacles 25 are welded to the further most rear of top frame members 20, and bottom frame members 22 respectively, second opposing vertical bow frame receptacles 27 are welded to the sides of top frame members 20 and bottom frame members 22 a first distance from the further most rear truck side wall frame member 42 respectively. Bow frames 18 are cut, modified and welded into opposing bow frame receptacles 25 and 27 respectively, providing a vertical dimension which is substantially equal to the corresponding vertical height of the module truck canvas support bows. Opposing pivot lugs 30 are welded a first distance from the further most rear truck side wall frame member 42 respectively, whereby a bow lift side frame works is loosely pinned, allowing a bow lift frame to pivot up and down. Stabilizing guide arms 26, are pre-cut and shaped from flat stock providing a vertical dimension which is substantial to extend below a module truck side walls 12 when a bow lift apparatus is in a raised position, a first, second and third stabilizing guide arm 26 is welded in a downwardly position to the bottom of opposing frame members 22, a first, second and third distance respectively from the further most rear truck side wall frame members 42. Thereby providing a stabilizing guide for an adjustable bow lift apparatus in a raised or closed position. Opposing actuators 16 are welded near the top of opposing side walls 12, in a vertical up right position (extending arms up), a first distance from the further most rear truck side wall frame members 42, actuators 16 are attached to the bottom sides of frame members 22 respectively, thereby providing a means of lifting and lowering an adjustable bow lift apparatus 28, when said actuators 16 are activated. The actuators 16 of an adjustable bow lift apparatus 28, are connected into the hydraulic system of a module truck 10, when the PTO of a module truck is engaged, the bed tilts in preparation of loading or unloading a cotton module, at the same time the bed tilts, the actuators 16 are activated and in turn lift the bow apparatus, when the loading or unloading operation is completed, and the PTO is disengaged, the bed lowers into a closed position, and the adjustable bow lift apparatus also lowers into a closed position ready for road travel. Those familiar in art will readily understand where several types of on-board power sources maybe used to activate and power actuators 16, such as air, electric or hydraulics. For the purpose of explanation, hydraulics are used in this embodiment.

A preferred embodiment of the invention has now been described in detail. Since changes and modifications to the above preferred embodiment may be made without departing from the spirit of the invention, the scope of the invention is not to be limited to the foregoing details, except as set forth in the appended claims.

What is claimed is:

1. An adjustable bow lift apparatus for use with a cotton module truck, said truck comprising: a cab, a chassis, a tilt chain bed frame and a rigid longitudinally extending support frame, said support frame having pivot means at a rearward end thereof for pivotal attachment to the bed frame, powered left means attached between the support frame and the bed frame for pivoting the bed frame with decking being mounted on the bed frame, a transverse front bulk head extending vertically upward from a forward end of said bed frame and having opposite longitudinally extending sidewalls projecting vertically upward from said bed frame, a plurality of bow frames detachably attached to a top of said side walls and supporting a canvas cover top, the bow lift apparatus having a frame and being mounted on pivot means spaced forwardly of terminal ends & atop the opposite side walls for movement between a rest position atop the sidewalls and a raised position wherein said bow lift apparatus extends angularly upward from said side walls, elevating means arranged between opposite bottom longitudinal plates of the bow lift frame and sidewalls for pivotally raising and lowering the bow lift apparatus and a guide means for guiding the bow lift apparatus into the rest position whereby clearance for a cotton module is provided when the bow lift apparatus is in the raised position during discharge of the cotton module from the truck.

2. An adjustable bow lift apparatus of claim 1 wherein the elevating means for raising and lowering the bow lift apparatus comprises a pair of hydraulic cylinders mounted on said opposite sidewalls and operatively connected to a hydraulic system of the truck.

3. An adjustable bow lift apparatus of claim 1 wherein the guide means comprise a plurality of vertical frame members adjacent the bottom longitudinal plates and extending below the top of the opposite sidewalls when the bow lift apparatus rests atop the opposite sidewalls.

4. An adjustable bow lift apparatus of claim 1 wherein a control means is provided and comprises a hydraulic switch in the cab of the truck for controlling the raising and lowering of the bow lift apparatus.

* * * * *